US012728299B2

(12) United States Patent
Ma et al.

(10) Patent No.: US 12,728,299 B2
(45) Date of Patent: Sep. 8, 2026

(54) ADJUSTABLE FACE MASK ASSEMBLY AND METHOD OF USING THE SAME

(71) Applicant: PIP Manyfacturing, Inc., Latham, NY (US)

(72) Inventors: Chuang Ma, Latham, NY (US); Sheng Zhou, Latham, NY (US); Hongbing Xiang, Latham, NY (US); Xiaojin Han, Latham, NY (US); Siwei Wang, Latham, NY (US)

(73) Assignee: PIP Manufacturing, Inc., Latham, NY (US)

( * ) Notice: Subject to any disclaimer, the term of this patent is extended or adjusted under 35 U.S.C. 154(b) by 533 days.

(21) Appl. No.: 18/329,233

(22) Filed: Jun. 5, 2023

(65) Prior Publication Data

US 2023/0398382 A1 Dec. 14, 2023

(30) Foreign Application Priority Data

Jun. 9, 2022 (CN) ........................ 202210647467.X

(51) Int. Cl.
*A62B 18/08* (2006.01)

(52) U.S. Cl.
CPC .................................. *A62B 18/084* (2013.01)

(58) Field of Classification Search
CPC ....... A62B 18/00; A62B 18/02; A62B 18/025; A62B 18/08; A62B 18/084; A61M 16/0683
See application file for complete search history.

(56) References Cited

U.S. PATENT DOCUMENTS

| | | | |
|---|---|---|---|
| 1,785,104 | A | 12/1930 | Wittmayer |
| 4,688,337 | A | 8/1987 | Dillner et al. |

(Continued)

FOREIGN PATENT DOCUMENTS

| | | | |
|---|---|---|---|
| CN | 202637766 U | 1/2013 | |
| CN | 203710567 U | 7/2014 | |

(Continued)

OTHER PUBLICATIONS

English Translation of JP Office Action dated Nov. 27, 2024 for JP Application No. 2023094445, 2 page(s).

(Continued)

*Primary Examiner* — Colin W Stuart
(74) *Attorney, Agent, or Firm* — Fredrikson & Byron, P.A.

(57) ABSTRACT

Various embodiments described herein are directed to a face mask assembly configured with a drop-down feature and methods of using the same. In various embodiments, a face mask assembly comprises a face mask configured for dynamic engagement with a first strap of a strap assembly such that the face mask is configured for selective movement along a strap length of the first strap between a donned position and a drop-down position, the face mask comprising: a first strap pathway configured to receive at least a portion of the first strap and a strap engagement tongue positioned along the first strap pathway and comprising a plurality of strap engagement teeth protruding from of the interior tongue surface; wherein the face mask is configured to be selectively adjustable between a dynamic configuration and a locked configuration based on the arrangement of the first strap relative to the strap engagement tongue.

20 Claims, 9 Drawing Sheets

(56) References Cited

U.S. PATENT DOCUMENTS

| | | | | |
|---|---|---|---|---|
| 5,181,507 A * | 1/1993 | Michel | A62B 18/084 128/206.17 |
| D421,801 S | 3/2000 | Brostrom et al. | |
| 6,536,435 B1 * | 3/2003 | Fecteau | A62B 18/084 128/201.24 |
| 6,591,837 B1 * | 7/2003 | Byram | A62B 18/084 128/207.11 |
| 8,505,536 B2 | 8/2013 | Kielow et al. | |
| 2002/0088466 A1 | 7/2002 | Brostrom et al. | |
| 2006/0070214 A1 | 4/2006 | Hsu | |
| 2009/0151053 A1 | 6/2009 | Belouin | |
| 2009/0293869 A1 | 12/2009 | Gunaratnam et al. | |
| 2010/0263673 A1 | 10/2010 | Kielow et al. | |
| 2013/0152948 A1 | 6/2013 | Inagaki et al. | |
| 2016/0082217 A1 | 3/2016 | Mclaren et al. | |
| 2020/0114178 A1 | 4/2020 | Waterford et al. | |
| 2021/0274864 A1 | 9/2021 | Lee et al. | |

FOREIGN PATENT DOCUMENTS

| | | | |
|---|---|---|---|
| CN | 204411525 U | 6/2015 | |
| CN | 306918202 | 11/2021 | |
| JP | 2003-299744 A | 10/2003 | |
| KR | 2001-0030758 A | 4/2001 | |
| KR | 20090010452 U * | 10/2009 | A62B 18/025 |
| KR | 20-2011-0012006 U | 12/2011 | |
| KR | 10-1729961 B1 | 4/2017 | |
| KR | 101723421 B1 * | 4/2017 | A62B 18/04 |
| RU | 00083103 | 9/2012 | |
| WO | 2009/062784 A1 | 5/2009 | |
| WO | 2017/031262 A1 | 2/2017 | |
| WO | 2020/049419 A1 | 3/2020 | |

OTHER PUBLICATIONS

JP Office Action Mailed on Nov. 27, 2024 for JP Application No. 2023094445, 4 page(s).

English Translation of KR Office Action dated Nov. 15, 2024 for KR Application No. 10-2023-0074367, 6 page(s).

KR Office Action Mailed on Nov. 15, 2024 for KR Application No. 10-2023-0074367, 6 page(s).

Extended European Search Report Mailed on Aug. 21, 2023 for EP Application No. 23177483, 7 page(s).

English Translation of JP Office Action dated May 14, 2024 for JP Application No. 2023094445, 3 page(s).

JP Office Action Mailed on May 14, 2024 for JP Application No. 2023094445, 4 page(s).

Europe Patent Office, "Communication pursuant to Article 94(3)" , From Application No. 23177483.7, Dated Oct. 23, 2025, pp. 8.

* cited by examiner

ADJUSTABLE FACE MASK ASSEMBLY AND METHOD OF USING THE SAME

CROSS-REFERENCE TO RELATED APPLICATIONS

This application claims priority pursuant to 35 U.S.C. 119(a) to Chinese Application No. 202210647467.X, filed Jun. 9, 2022, which application is incorporated herein by reference in its entirety.

FIELD OF THE INVENTION

Various embodiments of the present disclosure relate generally to a face mask assembly and, more particularly, to a face mask assembly having an at least partially dynamic configuration to facilitate adjustment between an operating configuration and a drop-down position.

BACKGROUND

Applicant has identified many technical challenges and difficulties associated with personal protective equipment such as respirators and other breathing-related protective equipment. Through applied effort, ingenuity, and innovation, Applicant has solved problems related to these wearable accessory arm straps by developing solutions embodied in the present disclosure, which are described in detail below.

BRIEF SUMMARY

Various embodiments are directed to an adjustable face mask assembly and method of using the same. In various embodiments, an adjustable face mask assembly may comprise A face mask assembly configured with a drop down feature, the face mask assembly comprising a face mask configured for dynamic engagement with at least a first strap of a strap assembly such that the face mask is configured for selective movement in one or more directions along a strap length of the first strap between a donned position and a drop-down position, the face mask comprising: a first strap pathway comprising an exterior pathway surface positioned on a first lateral side of the face mask, the first strap pathway being configured to receive at least a portion of the first strap along the exterior pathway surface; and a strap engagement tongue defined by a material thickness extending between an exterior tongue surface and an interior tongue surface, the strap engagement tongue comprising a plurality of strap engagement teeth protruding from of the interior tongue surface; wherein the strap engagement tongue is positioned along the first strap pathway such that the exterior tongue surface defines at least a portion of the exterior pathway surface of the first strap pathway; wherein the face mask is configured to be selectively adjustable between a dynamic configuration and a locked configuration relative to the first strap based at least in part on the arrangement of the first strap relative to the strap engagement tongue; and wherein, in the locked configuration, the plurality of strap engagement teeth are configured to provide frictional resistance to the first strap to resist the movement of the face mask relative to the strap length of the first strap.

In various embodiments, the face mask may be dynamically engaged with the strap assembly via a connection of the first strap to a face mask cover of the face mask, wherein the first strap pathway is defined along an exterior surface of the face mask cover. In various embodiments, the face mask assembly may further comprise a face engagement component configured to engage a face of a user at a seal interface that extends along a perimeter of an open end of the face engagement component; and wherein the face engagement component and the face mask cover define distinct components configured to be removably attached to one another. In various embodiments, the face mask assembly may further comprise a second strap pathway comprising a second exterior pathway surface defined along the exterior surface of the mask cover and positioned on a second lateral side of the face mask, the second strap pathway being configured to receive at least a portion of a second strap of the strap assembly along the second exterior pathway surface such that the face mask is configured for selective movement in one or more directions along a second strap length of the second strap; and a second strap engagement tongue defined by a second material thickness extending between a second exterior tongue surface and a second interior tongue surface, the second strap engagement tongue comprising a second plurality of strap engagement teeth protruding from of the second interior tongue surface; wherein the second strap engagement tongue is positioned along the second strap pathway such that the second exterior tongue surface defines at least a portion of the second exterior pathway surface of the second strap pathway; and wherein, in the locked configuration, the second plurality of strap engagement teeth are configured to provide frictional resistance to the second strap to resist the movement of the face mask relative to the second strap length of the second strap.

In various embodiments, the first strap may be defined along the strap length between a first strap end and a second strap end, wherein the first strap end and the second strap end of the first strap are each configured for attachment to a head support component of the strap assembly such that the first strap defines a closed-loop strap portion including an intermediate strap portion defined in between the first strap end and the second strap end, and wherein the first strap pathway is configured to receive the first strap at the intermediate strap portion such that the selective movement of the face mask between the donned position and the drop-down position is at least partially defined within the close-loop strap portion of the first strap. In certain embodiments, a second strap of the strap assembly may be defined along a second strap length between two opposing strap ends, wherein both of the two opposing strap ends of the second strap are configured for attachment to the head support component of the strap assembly such that the second strap defines a second closed-loop strap portion including a second intermediate strap portion defined in between the two opposing strap ends, and wherein the second strap pathway is configured to receive the second strap at the second intermediate strap portion such that the selective movement of the face mask between the donned position and the drop-down position is defined at least partially within the second closed-loop strap portion of the second strap.

In various embodiments, the first strap pathway may comprise a strap pathway protrusion further comprising a material protrusion extending from a first lateral side edge of the first strap pathway in a width direction towards a second lateral side edge of the first strap pathway, wherein the strap pathway protrusion s configured to physically engage the first strap in order to provide frictional resistance to the first strap to resist the movement of the face mask relative to the strap length of the first strap. In certain embodiments, the strap pathway protrusion may be arranged in a position along the first strap pathway that is at least substantially aligned with at least a portion of the strap engagement tongue. In certain embodiments, the strap pathway protrusion and the strap engagement tongue may be provided at a central portion of the first strap pathway, the central portion being defined by a midpoint along a strap pathway length of the first strap pathway at least approximately halfway between a first strap pathway end and a second strap pathway end.

In various embodiments, the first strap pathway may extend along a strap pathway length between a first strap pathway end and a second strap pathway end, and wherein the first strap pathway further comprises a second plurality of strap engagement teeth protruding from of the exterior pathway surface at the second strap pathway end of the first strap pathway. In certain embodiments, the second strap pathway end of the first strap pathway may be defined by a bottom end of the first strap pathway positioned at least substantially adjacent a bottom edge of the face mask. In certain embodiments, the second plurality of strap engagement teeth may be configured to protrude from the exterior pathway surface in an at least substantially outward direction away from the face mask so as to provide frictional resistance to a bottom surface of the first strap to resist the movement of the face mask relative to the first strap length of the first strap. In certain embodiments, the face mask assembly may further comprise a second strap pathway comprising a second exterior pathway surface defined along the exterior surface of the mask cover and positioned on a second lateral side of the face mask, the second strap pathway being configured to receive at least a portion of a second strap of the strap assembly along the second exterior pathway surface such that the face mask is configured for selective movement in one or more directions along a second strap length of the second strap; wherein the second strap pathway extends along a second strap pathway length between a third strap pathway end and a fourth strap pathway end, and wherein the second strap pathway further comprises a third plurality of strap engagement teeth protruding from of the second exterior pathway surface at the fourth strap pathway end of the second strap pathway; wherein the third plurality of strap engagement teeth are configured to protrude from the second exterior pathway surface in an at least substantially outward direction away from the face mask so as to provide frictional resistance to a bottom surface of the second strap to resist the movement of the face mask relative to the second strap length of the second strap.

In certain embodiments, the first strap pathway may be defined by an at least partially curved profile. In certain embodiments, the at least partially curved profile of the first strap pathway may be defined by an arc-shaped curve having a curve apex and a curve opening, the curve opening facing at least substantially towards the first lateral side of the face mask. In various embodiments, the first strap pathway may further comprise at least one strap engagement slot defined by an opening in the exterior pathway surface that is configured to receive a portion of the first strap to facilitate the dynamic engagement of the first strap by the face mask. In certain embodiments, the one or more strap engagement slots may comprise a plurality of strap engagement slots distributed along a strap pathway length of the first strap pathway, each of the plurality of strap engagement slots being configured to receive a respective portion of the first strap. In certain embodiments, the plurality of strap engagement slots distributed along the strap pathway length of the first strap pathway may include a first slot, a second slot, a third slot, and a fourth slot, each extending in respective width directions between opposing lateral side edges of the first strap pathway, and wherein the first strap pathway is configured to dynamically engage the first strap by threading the first strap in alternating directions through adjacent slots of the plurality of strap engagement slots. In certain embodiments, the strap engagement tongue may be positioned along the strap pathway length in between the second slot and the third slot. In various embodiments, the first strap pathway may comprise a strap adjustment gap defined by a slot opening in the exterior pathway surface extending around at least a portion of an outer perimeter of the strap engagement tongue to separate the strap engagement tongue from adjacent portions of the exterior pathway surface of the first strap pathway.

BRIEF DESCRIPTION OF THE DRAWINGS

Reference will now be made to the accompanying drawings, which are not necessarily drawn to scale, and wherein.

DETAILED DESCRIPTION

Figure 1:
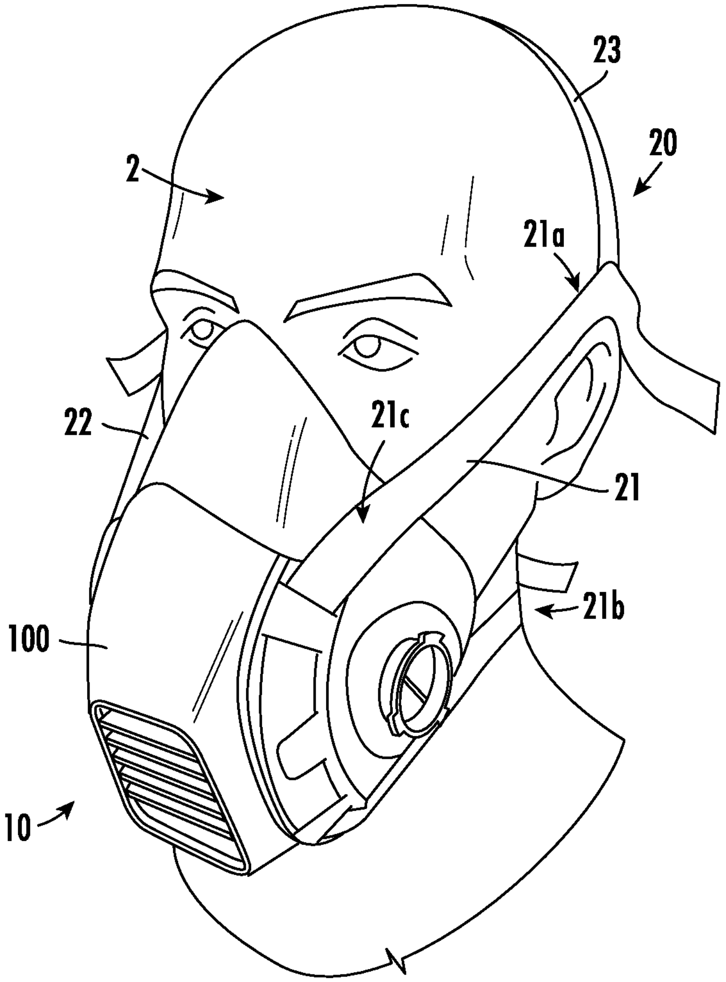
FIG. 1 illustrates an exemplary face mask assembly in accordance with one or more embodiments described herein.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations. As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the terms "top" and "bottom" refer to a relative top or bottom in an instance the face mask is position on a user's face. For example, the top edge of a strap pathway may be closer to the eyes of a user than the bottom edge of the strap pathway. Further, as used herein, the terms "above," "over top," "below," "beneath," "internal" and "external" refer to a relative interior or exterior in an instance the face mask is position on a user's face. For example, the interior surface of a strap engagement tongue may face an interior volume of the face mask and may face towards the mouth of a user, whereas the exterior surface of a strap engagement tongue may face in an outward direction away from the interior volume of the face mask, such as, for example, away from the mouth of a user.

Various embodiments herein provide a face mask assembly with a drop down function and a method of using the same. Current face masks, while effective when donned by a user, are often difficult to remove and reapply to a user's face (to move between the donned position in which the mask is applied to the user's face to form a seal therewith and a removed position in which the mask is not applied to the user's face. Embodiments discussed herein include a drop-down function that allows for a user to quickly and effectively don and remove the mask during operation, while supporting the mask for quick access when in drop-down position (e.g., dangling by straps from the user's head). The ability to quickly transition between the donned position and the drop-down position enables a more efficient user experience, especially in situations where a user may have to quickly alternate between donning and removing the face mask. For example, in certain embodiments, the face mask may have a selectively dynamic configuration relative to the straps of a strap assembly. The face mask may be dynamically engaged with first and second straps such that the face mask may be selectively adjusted between the donned position (e.g., covering a portion of the user's face during operation) and the drop-down position (e.g., a removed position) while the strap assembly remains engaged with the head of the user. Such an exemplary configuration enables the user to avoid having to remove a helmet or other piece of protective headwear in order to adjust and/or remove the face mask.

As described herein, in various embodiments, the face mask is configured such that a user may selectively adjust the face mask between a locked configuration and a dynamic configuration. For example, the face mask itself is dynamically engaged with the support straps such that a portion of each strap is positioned along respective strap pathways defined along an exterior surface of the face mask. The dynamic engagement of the face mask with the straps is enabled by a plurality of strap engagement components defined along the strap pathways of the face mask. The face mask may be selectively adjusted between the locked configuration and the dynamic configuration by rearranging the portion of the strap positioned along the strap pathway relative to one or more of the strap engagement components. For example, in various embodiments, the face mask may be selectively adjusted to a locked configuration based at least in part on the arrangement of the first strap relative to a strap engagement tongue provided along the first strap pathway. As described herein, the strap engagement components—including a strap engagement tongue, strap engagement slots, a strap pathway protrusion, and one or more pluralities of strap engagement teeth—are configured to efficiently and reversibly lock the mask in the donned position to impede unintentional dislocation of the mask during use.

FIG. 1 illustrates an exemplary face mask assembly in accordance with one or more embodiments described herein. In particular, FIG. 1 shows an exemplary face mask assembly 10 (e.g., a face mask 10) comprising a face mask cover 100 and a strap assembly 20. In various embodiments, an exemplary face mask 10 may be configured to receive, engage with, and/or otherwise be connected to at least a portion of a strap assembly 20 configured to be operably coupled with the head (e.g., and/or face) of a user 2 during operation of the face mask assembly 10 such that the face mask cover 100 of the face mask assembly 10 is configured to be worn (e.g., donned) against the face of the user 2.

In various embodiments, the strap assembly 20 of an exemplary face mask assembly 10 may include a first strap 21, a second strap 22, and a head support component 23 (e.g., an adjustable head band that may be resized as necessary to accommodate a particular user's head). In some embodiments, the head support component 23 may be configured to at least partially encircle the user's head 2 during operation. For example, various head support components and/or other strap assembly 20 components attached to the head support component 23 may be used to hold the face mask 10 in a desired position relative to the face of the user 2, such as, for example, in a donned position and/or a drop-down position, as described herein. In various embodiments, the first strap 21 and/or the second strap 22 may be a unitary piece with the head support component 23 or may be coupled to the head support component 23 at one or more ends thereof. For example, in various embodiments, the first strap 21 and the second strap 22 may each be attached at both a first end and an opposite second end thereof to the head support component 23 such that the first strap 21 and a first portion of the head support component 23 collectively define a first closed-loop strap configuration (e.g., along which a first portion of the face mask cover 100 may be moved) and the second strap 22 and a second portion of the head support component 23 collectively define a second closed-loop strap configuration (e.g., along which a second portion of the face mask 100 may be moved). For example, the first strap 21 and the second strap 22 may each extend between the head support component 23 and a respective portion of the face mask cover 100, such as, for example, one of the first strap pathway 110 and the second strap pathway 120, located on first and second lateral sides of the face mask cover 100, respectively.

In various embodiments, the head support component 23 may be made out of a plastic material, such as polypropylene, although other materials may be utilized in certain embodiments. For example, the head support component 23 may be at least partially made out of textile webbing or netting, or rubber. Various other configurations of exemplary head support components 23 may be contemplated in accordance with various embodiments of the present disclosure.

In various embodiments, the first and second straps 21, 22 of the strap assembly may each extend along a strap length between a first end and an opposite second end. For example, as illustrated in FIG. 1, the first strap 21 may extend along a strap length between a first end 21*a* and an opposite second end 21*b*. In various embodiments, an exemplary face mask cover 100, as described herein, may be configured to facilitate a closed-loop configuration of each of the first and second straps 21, 22, wherein the first and second ends of each of the first and second straps 21, 22 are configured to be attached to the head support component 23 and/or another portion of the strap assembly 20 adjacent thereto (e.g., behind a user's head 2 or along a lateral side of the user's face). In such an exemplary configuration, the first and second straps 21, 22 may each be arranged such that the looped configuration defined thereby extends along a respective side of the user's 2 face (e.g., along a left side or right side of the user's face). For example, in such an exemplary looped configuration, an intermediate strap portion of each of the first and second straps 21, 22 (e.g., a first intermediate strap portion 21*c*)—defined along the respective strap length between the first and second strap ends of the strap—may be engaged with a respective lateral portion of the face mask cover 100 (e.g., at a respective strap pathway). In various embodiments, the facemask cover 100 may be configured for dynamic engagement with the first and second straps 21, 22 of the strap assembly 20 such that the face mask cover 100 may be moved along the respective strap lengths of the first and second straps 21, 22 for selective adjustment of the face mask 10 between a donned position, as illustrated in FIG. 1, and a drop-down position. For example, a user reconfiguring the face mask cover 100 between a donned position and a drop-down position may comprise moving the face mask cover 100 dynamically (e.g., slidably) engaged with the strap assembly 20 along respective strap lengths of the first and second straps 21, 22 such that at least a portion of the face mask 10 including the face mask cover 100 is moved from a first position over the mouth of the user 2 (e.g., the donned position) to a second position wherein the face mask cover 100 is positioned away from and/or below the face/chin of the user 2, as described in further detail herein.

As described herein, the straps of the strap assembly (e.g., the first and second straps 21, 22) define a strap width, measured perpendicular to the strap length, and a strap thickness, measured perpendicular to both the strap length and the strap width. It should be understood that the straps may comprise a flexible material, such as a woven material, and the thickness of the strap may correspond to the thickness of individual fibers within the strap. In certain embodiments, the length of a strap may be adjustable (e.g., via an adjustment mechanism at one or both ends of the strap).

In various embodiments, at least a portion of the face mask 10 may have a selectively dynamic configuration relative to the strap assembly 20 of the face mask assembly 1. For example, in various embodiments, the face mask 10 (e.g., the face mask cover 100) may be dynamically engaged with the first and second straps 21, 22 of the strap assembly 20 such that at least a portion of the face mask 10 may be selectively adjusted between a donned position (e.g., covering a portion of the user's 2 face during operation) and a drop-down position (e.g., a removed position) while the head support component 23 of the strap assembly 20 remains engaged with the head of the user 2. Such an exemplary configuration avoids the user 2 having to remove a helmet or other piece of protective headwear being worn over the head support component 23 in order to adjust and/or remove the face mask 10. For example, FIG. 1 illustrates an exemplary face mask assembly 10 arranged in a donned position, wherein the face mask 10 is being donned by the user 2, wherein the strap assembly 20 is engaged with the head of the user 2 and the user 2 is wearing the face mask 10 over at least a portion of the user's face such that the face mask extends over and/or covers the user's nose and mouth. As described herein, the face mask 10 (e.g., the facemask cover 100) may be configured such that a user may selectively adjust the face mask 10 from the locked configuration shown in FIG. 1 to a dynamic configuration wherein the face mask cover 100, and, in various embodiments, the other face mask 10 components attached thereto, may be slid and/or otherwise translated along the lengths of the first and second straps 21, 22 such that at least the facemask cover 100 is moved away from the face of the user 2 to a drop-down position wherein the face mask cover 100 does not cover the user's 2 nose and/or mouth.

Figure 2A:
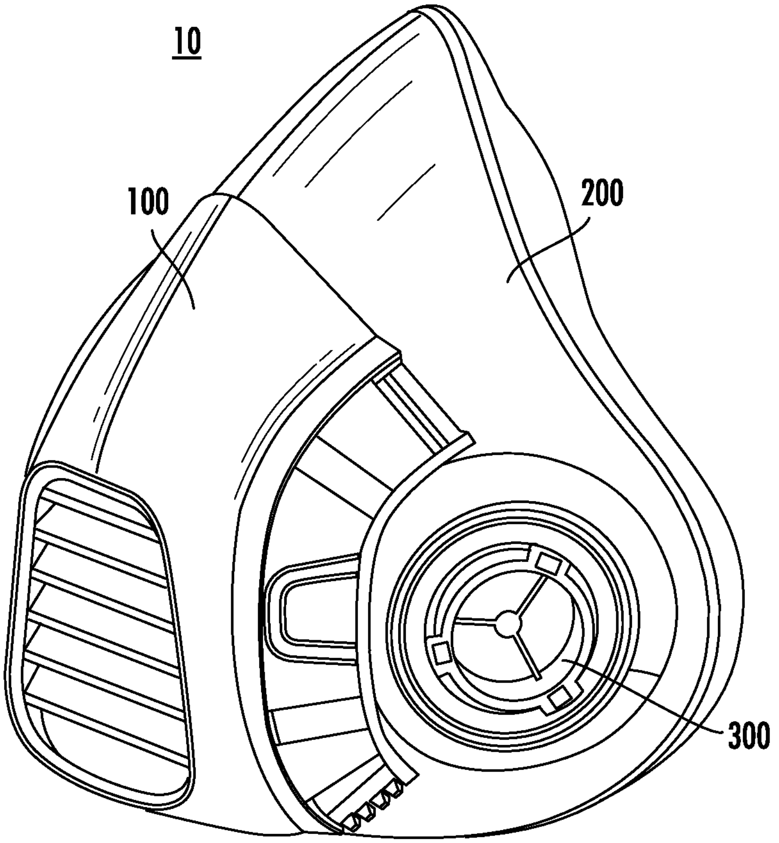
FIGS. 2A-2B illustrate a perspective view and an exploded view, respectively, of an exemplary face mask in accordance with one or more embodiments described herein.
Figure 2B:
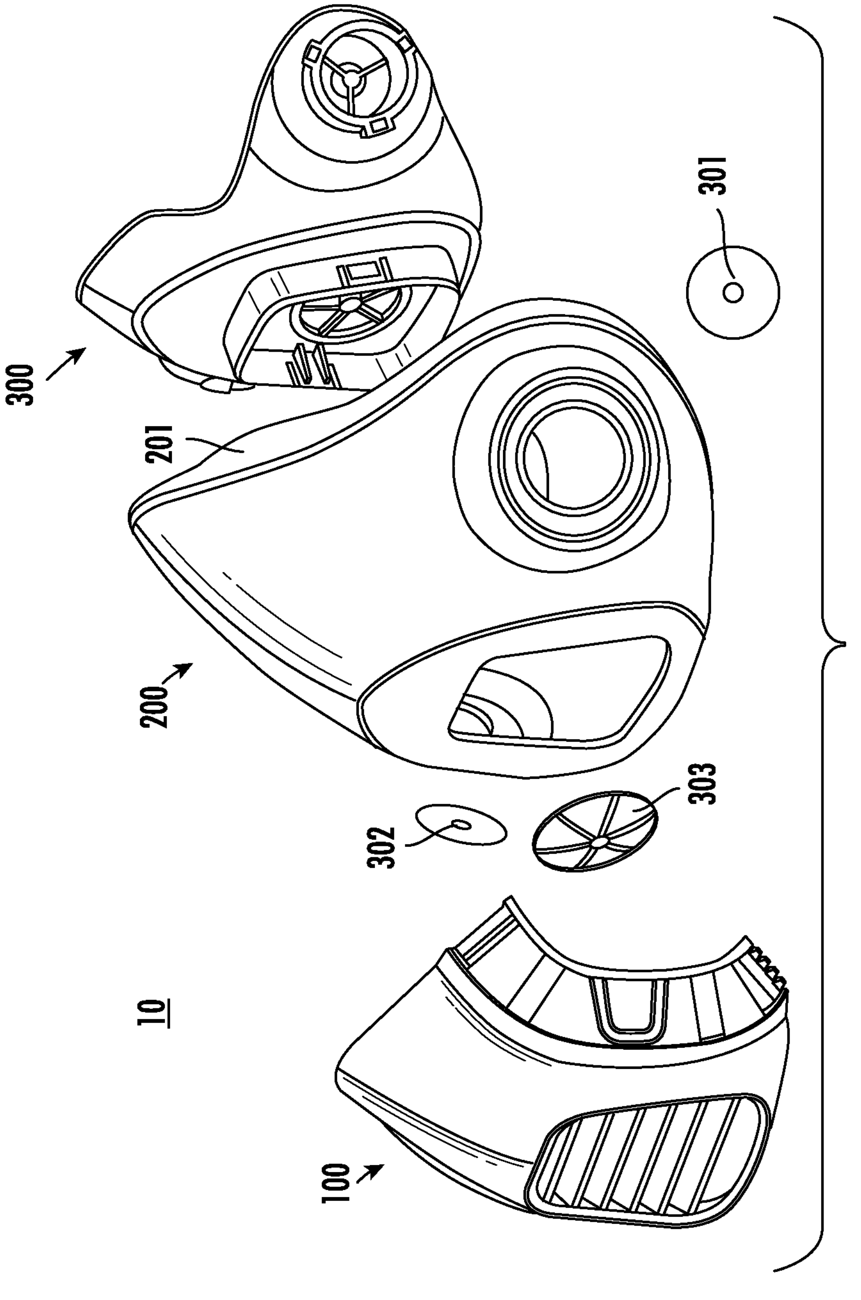

FIGS. 2A-2B illustrate a perspective view and an exploded view, respectively, of an exemplary face mask in accordance with one or more embodiments described herein. In particular, FIGS. 2A and 2B illustrate an exemplary face mask 10 comprising a face mask cover 100, a face engagement component 200, and a bayonet component. For example, as shown, in various embodiments, the face mask 10 may comprise a plurality of pieces (e.g., face mask cover 100, a face engagement component 200, and/or a bayonet component 300) configured to be removably attached to one another.

In various embodiments, the face engagement component 200 of an exemplary face mask 10 may be configured to engage the face of a user at a seal 201 that extends along the perimeter of an open end of the face engagement component 200 to define a breathing chamber within an interior volume of the face mask 10. For example, the face engagement component 200 may comprise a rigid and at least substantially gas impermeable material, such as polyvinyl chloride, polycarbonate, fiberglass, carbon fiber, and/or the like. In various embodiments, the open end of the face engagement component 200 may be surrounded by a seal 201, such as, for example, a resilient/flexible sealing member (e.g., a rubber sealing member, a flexible polymer sealing member, and/or the like), configured to form a seal between the face mask 10 and the user's face. The seal 201 may be configured to contour to a user's face, and the resilience/flexibility of the seal may be configured to accommodate differences in the shape of various users' faces. In certain embodiments, the seal 201 may be customized (e.g., through a thermoforming process) to a particular user's face, however it should be understood that other embodiments may provide at least substantially universal seal configurations configured to accommodate a plurality of user face shapes.

As shown in FIG. 2B, an exemplary face mask 10 may include one or more inhalation valves 301, 302 and/or exhaust valves 303, which may be configured to accept particulate, odor, and/or other breathing-based filters (or closed air sources). In certain embodiments, the inhalation valves 301, 302 and/or exhaust valves 303 may be attached to a bayonet component 300 configured to secure the valves 301, 302, 303 and be arranged within the interior volume of the face engagement component 200. As illustrated, the bayonet component 300 may be positioned relative to the 200 such that the valves 301, 302, 303 extend through respective openings in the face engagement component 200 (e.g., defined between an internal surface and an external surface of the face engagement component 200 surface), so as to enable air to pass into the interior of the face mask 10 for the user to breathe (e.g., after passing through desired filtration media, such as a filtration cartridge). Moreover, the interior volume of the face engagement component 200 that defines the breathing chamber of the face mask 10 may be in fluid communication with the inhalation valves 301, 302 and/or exhaust valves 303 such that air can pass between the inhalation valves 301, 302 and/or exhaust valves 303 and the breathing chamber. The breathing chamber may be configured to enclose the user's mouth and/or nose therein, and may be surrounded by the seal discussed above.

In various embodiments, an exemplary face mask 10 may further comprise a face mask cover 100 positioned along an exterior surface of the face engagement component 200 and configured to facilitate the selectively dynamic engagement of the face mask 10 to the strap assembly.

FIGS. 3A-3D illustrate various views of an exemplary face mask in accordance with one or more embodiments described herein. In particular, FIGS. 3A-3D illustrate various views of an exemplary face mask cover 100 according to various embodiments described herein. In various embodiments, the face mask cover 100 may comprise exhaust openings 130 and one or more strap engagement features configured to facilitate a dynamic configuration between the strap assembly and the face mask, as described herein, based at least in part on the attachment of at least a portion of the strap assembly to the one or more strap engagement features of the face mask cover 100.

Figure 3A:
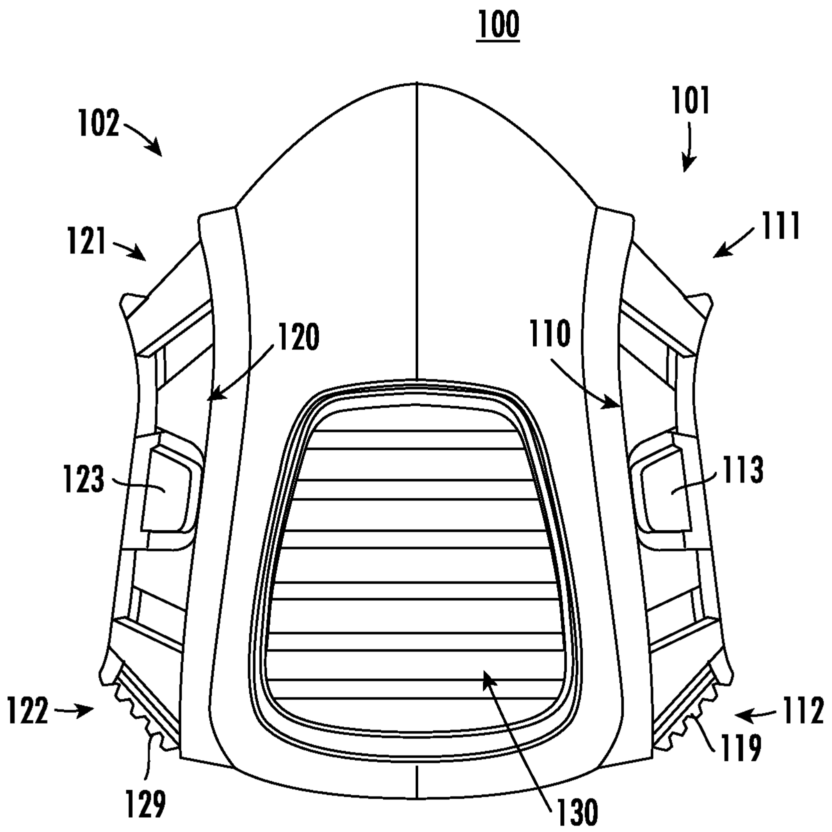
FIGS. 3A-3D illustrate various views of an exemplary face mask in accordance with one or more embodiments described herein.

As illustrated in FIG. 3A, the face mask cover 100 may comprise one or more strap pathways configured to receive a strap in order to facilitate the connection between the face mask 10 and the strap assembly of the face mask assembly, such as, for example, a first strap pathway 110 and a second strap pathway 120 defined along opposing lateral sides 101, 102 (e.g., a right side and a left side) of the face mask cover 100. As described herein, each strap pathway (e.g., first strap pathway 110, second strap pathway 120) may define a strap pathway length that extends between a first strap pathway end and a second strap pathway end. An exemplary strap pathway, such as, for example, first strap pathway 110 illustrated in FIGS. 3A-3B, may be configured to receive at least a portion of a strap of the strap assembly (e.g., a first strap) such that the at least a portion of the strap is at least partially connected to the face mask cover 100 in a position along the strap pathway 110, 120 (e.g., along the strap pathway length thereof) between the first strap pathway end 111, 121 and the second strap pathway end 112, 122. For example, the face mask cover 100 may include a first strap pathway 110 and a second strap pathway 120 that are each provided along an exterior of the face mask cover 100 such that at least a portion of the first strap and the second strap, respectively, received within the respective strap pathways may be arranged (e.g., may pass) along the exterior of the face mask cover 100 (e.g., along a strap pathway length between a first strap pathway end and a second strap pathway end).

Figure 3B:
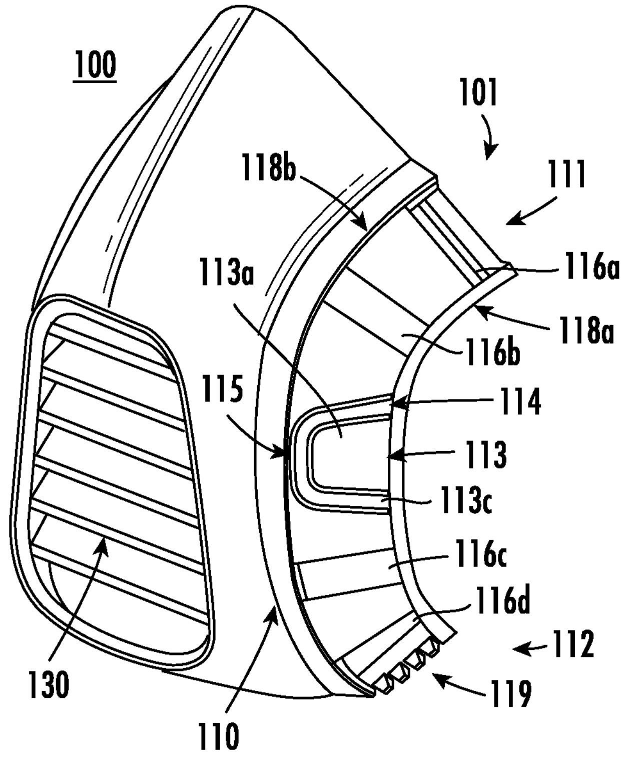

In various embodiments, an exemplary strap pathway of the face mask cover 100 (e.g., a first strap pathway 110, a second strap pathway 120) comprise a non-linear profile such that the strap pathway length is defined by at least one curve (e.g., a radius of curvature) between the first strap pathway end and the second strap pathway end. For example, as illustrated in FIG. 3B, the first strap pathway 110 of the face mask cover 100 comprises an at least partially curved profile defined by an arc-shaped curve (e.g., a frontward-facing an arc-shaped curve) having a curve apex facing in an at least substantially front-facing direction (e.g., at least partially in a direction away from/in front of a user) and a curve opening facing in the at least substantially opposite rear-facing direction (e.g., at least partially in a direction towards a back portion of a user's head). In such an exemplary configuration, wherein a first strap of the strap assembly is slidably attached to the face mask cover 100 via the selectively dynamic engagement between the first strap and the first strap pathway 110, the curved profile of the first strap pathway 110 is configured to facilitate the arrangement of first strap extending therealong in a closed-looped configuration wherein both ends of the first strap are connected to the head support component of the strap assembly, as describe herein.

Figure 3C:
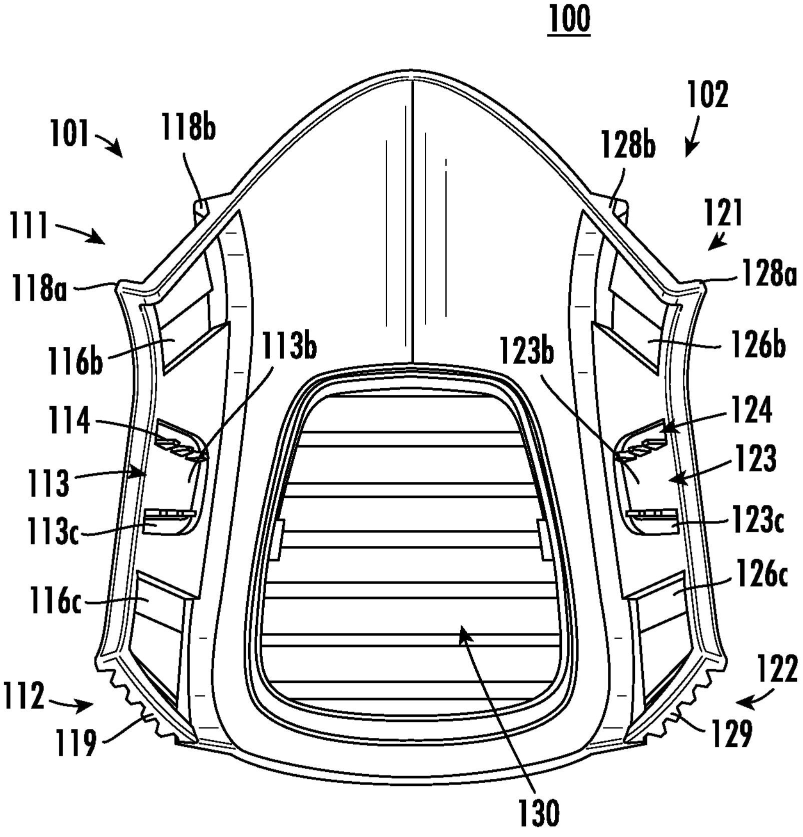
Figure 3D:
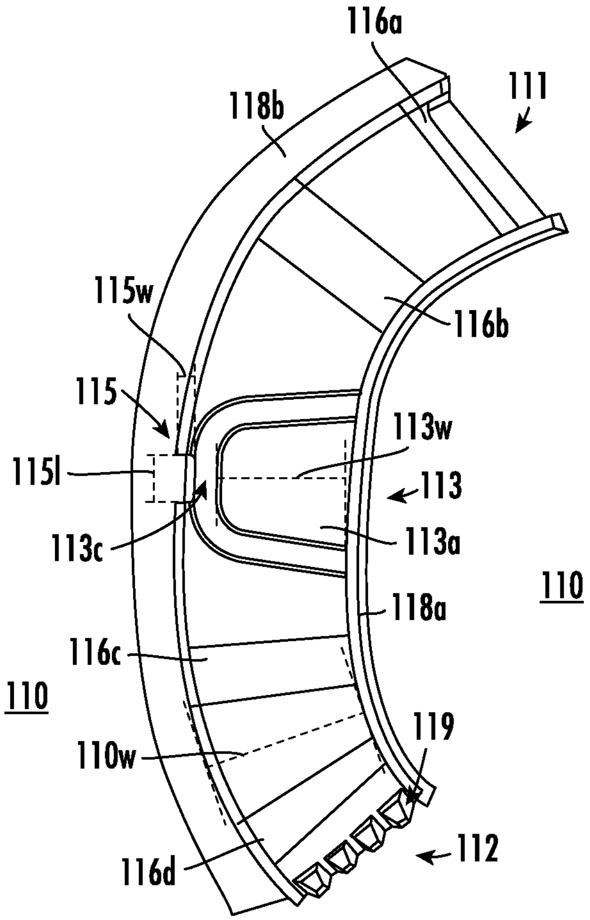

Further, in various embodiments, an exemplary strap pathway (e.g., first strap pathway and/or a second strap pathway 120) may be defined by a strap pathway width that is measured perpendicular to the strap pathway length, such as, for example, laterally in a direction perpendicular to the opposing lateral side edges (e.g., a first lateral side edge 118*a*, 128*a* and a second lateral side edge 118*b*, 128*b*) provided on either side of the strap pathway. For example, FIG. 3D illustrates an exemplary strap pathway 110 defined by a strap pathway width 110*w* that is measured perpendicularly between opposing lateral side edges 118*a*, 118*b* of the strap pathway 110. As a non-limiting example, in various embodiments, the strap pathway width of an exemplary strap pathway 110 may be at least approximately between 5.0 mm and 30.0 mm (e.g., between 10.0 mm and 15.0 mm). In various embodiments, a width of an exemplary strap pathway (e.g., first strap pathway 110) of the face mask cover 100 may be at least as wide as the width of the first strap engaged therewith such that the opposing lateral side edges of the strap pathway are configured to provide minimal frictional resistance to a strap (e.g., an intermediate strap portion) as the strap moves along the strap pathway relative to the face mask cover 100.

As illustrated in FIG. 3B, a first strap pathway 110 may include a first opposing side edge 118*a* and a second opposing side edge 118*b* provided at respective lateral sides of the first strap pathway 110 and extending along at least a portion of the strap pathway length between the first strap pathway end 111 and the second strap pathway end 112. In various embodiments, one or more of the lateral side edges of a strap pathway may define an edge, a feature having a raised configuration relative to the adjacent portion of the strap pathway defined in between the opposing lateral side edges, and/or any other boundary-defining feature configured to define a lateral boundary of the strap pathway. For example, as illustrated in FIG. 3B, the first strap pathway comprises opposing lateral side edges 118*a*, 118*b* that are each defined by raised features protruding from the exterior surface of the face mask cover 100 such that the first strap pathway 100 embodies a channel defined by an exterior surface extending between the opposing lateral sidewalls and configured to at least partially define and/or constrain the movement of the portion of the first strap arranged therein in at least one width direction.

In various embodiments, an exemplary face mask cover 100 may comprise one or more strap engagement components that may be positioned along the one or more strap pathways of the face mask cover 100 (e.g., the first strap pathway 110) in order to facilitate engagement with at least a portion of a strap (e.g., an intermediate strap portion) received within the strap pathway. For example, as described in further detail herein, the one or more strap engagement components of the face mask cover 100 may be configured to facilitate a selectively dynamic engagement between the strap assembly and the face mask cover 100 wherein the face mask cover 100 may be selectively configured (e.g., adjusted) by a user in either a dynamic or locked configuration based at least in part on arrangement of the strap portion within the strap pathway 110 (e.g., the intermediate strap portion) with respect to the one or more strap engagement components.

As an illustrative example, the exemplary face mask cover 100 illustrated in FIG. 3B comprises a plurality of strap engagement components positioned along the first strap pathway 110 and configured to engage at least a portion of a first strap positioned therein, including a strap engagement tongue 113, a first plurality of strap engagement teeth 114 extending from an interior-facing surface of the strap engagement tongue 113, a strap pathway protrusion 115, a plurality of strap engagement slots 116 positioned along the strap pathway length of the first strap pathway 110, and a second plurality of strap engagement teeth 119 disposed at the second strap pathway end 112.

In various embodiments, the face mask cover 100 may comprise a plurality of strap engagement slots distributed along the strap pathway length of each strap pathways (e.g., the first strap pathway 110 and the second strap pathway 120). In various embodiments, an exemplary strap engagement slot may comprise a slot, an aperture, and/or any other opening configured for receiving a strap (e.g., a portion of the strap length of the strap) therethrough. For example, an exemplary strap engagement slot may extend through the thickness of the face mask cover 100 between an exterior surface and an interior surface thereof such that a strap received within the strap engagement slot extends through the face mask cover 100 (e.g., within a strap pathway).

In various embodiments, the face mask cover 100 may comprise a first plurality of strap engagement slots defined at respective positions along the first strap pathway 110, each of which may be configured to receive a portion of a first strap therethrough. As illustrated, the first plurality of strap engagement slots provided along the first strap pathway 110 may include a first strap engagement slot 116*a*, a second strap engagement slot 116*b*, a third strap engagement slot 116*c*, and a fourth strap engagement slot 116*d*. At least a portion of the plurality of strap engagement slots 116*a*, 116*b*, 116*c*, 116*d* may be arranged so as to extend in a width direction along a width of the first strap pathway 110 at least partially between the opposing lateral side edges 118*a*, 118*b*. As illustrated, the plurality of strap engagement slots 116*a*, 116*b*, 116*c*, 116*d* may comprise one or more sets of adjacent strap engagement slots, such as, for example, the first strap engagement slot 116*a* and the second strap engagement slot 116*b*, wherein the first strap engagement slot 116*a* is arranged within the first strap pathway 110 in between the first strap pathway end 111 and the second strap engagement slot 116*b*, and the third strap engagement slot 116*c* and the fourth strap engagement slot 116*d*, wherein the fourth strap engagement slot 116*d* is arranged within the first strap pathway 110 in between the third strap engagement slot 116*c* and the second strap pathway end 112.

In various embodiments, the plurality of strap engagement slots 116*a*, 116*b*, 116*c*, 116*d* may be configured to facilitate the arrangement of at least a portion of a first strap (e.g., an intermediate strap portion thereof) within the first strap pathway 110 by enabling the first strap to be threaded into and/or out of adjacent strap engagement slots of the plurality 116*a*, 116*b*, 116*c*, 116*d* in opposite directions such that at least a portion of the first strap arranged between one or more sets of adjacent strap engagement slots of the plurality is configured to extend along an interior surface of the face mask cover 100 between the adjacent strap engagement slots. For example, in various embodiments, the exemplary face mask cover 100 illustrated in FIGS. 3A and 3B may be configured to receive a first strap within the first strap pathway 110 by the first strap being provided from an exterior of the face mask cover 100 through a first strap engagement slot 116*a* in an inward direction (e.g., toward an interior surface of the face mask cover 100) and, further, from the interior of the face mask cover 100 through a second strap engagement slot 116*b* adjacent the first strap engagement slot 116*a* in an outward direction (e.g., toward an exterior surface of the face mask cover 100). In such an exemplary configuration, the first strap may extend from the second strap engagement slot 116*b* along an exterior surface of the face mask cover 100 across a central portion of the first strap pathway 110 (e.g., defined by a midpoint along the strap pathway length thereof, at least approximately halfway between the first strap pathway end 111 and the second strap pathway end 112). The first strap may be further provided from the exterior of the face mask cover 100 through a third strap engagement slot 116*c* in an inward direction and, further, from the interior of the face mask cover 100 in an outward direction through a fourth strap engagement slot 116*d* adjacent the third strap engagement slot 116*c*.

As illustrated, in various embodiments, the first strap engagement slot 116*a* and the fourth strap engagement slot 116*d* of the face mask cover 100 may embody outer slots provided along the first strap pathway 110 in positions at least substantially proximate the first strap pathway end 111 and the second strap pathway end 112, respectively. Further, in various embodiments, as illustrated the second strap engagement slot 116*b* and the third strap engagement slot 116*c* of the face mask cover 100 may embody inner slots provided along the first strap pathway 110 in positions between the first strap engagement slot 116*a* and the central portion of the first strap pathway 110 and the fourth strap engagement slot 116*d* and the central portion of the first strap pathway 110, respectively. As described herein, a strap of the strap assembly (e.g., the first strap, the second strap) may be threaded in alternating directions through adjacent slots of the plurality of strap engagement slots of the plurality 116*a*, 116*b*, 116*c*, 116*d* such that the portion of the first strap disposed between the second strap engagement slot 116*b* and the third strap engagement slot 116*c* extends along the exterior surface of the face mask cover 100 within the first strap pathway 110.

In various embodiments, the plurality of strap engagement slots 116*a*, 116*b*, 116*c*, 116*d* may each comprise a slot width that is larger than the width of the first strap configured to be received within the first strap pathway 110, as measured in a width direction perpendicular to the strap pathway length (e.g., perpendicularly between the opposing lateral side edges 118*a*, 118*b* of the first strap pathway 110) such that a portion of the first strap passing therethrough may move relatively freely (e.g., there may be some frictional resistance, but the strap may generally move freely). Similarly, the plurality of strap engagement slots 116*a*, 116*b*, 116*c*, 116*d* may each comprise a slot length that is larger than the thickness of the first strap configured to be received within the first strap pathway 110, as measured in a direction defined along the strap pathway length such that the portion of the first strap passing therethrough may move relatively freely (e.g., there may be some frictional resistance, but the strap may generally move freely).

In various embodiments, the one or more strap engagement components of the exemplary face mask cover 100 may further comprise at least one strap engagement tongue positioned along at least one of the strap pathways and configured to be selectively engaged by a portion of the strap extending along the strap pathway in order to provide sufficient frictional resistance to the strap to at least substantially minimize the relative movement of the strap along the strap pathway. In various embodiments, an exemplary face mask cover 100 having a first strap pathway 110 and a second strap pathway 120 may comprise a first strap engagement tongue 113 along the first strap pathway length of the first strap pathway 110 and a second strap engagement tongue 123 along the second strap pathway length of the second strap pathway 120. The strap engagement tongue 113 may comprise a material protrusion defined by a thickness that extends between an exterior tongue surface 113*a* (shown in FIG. 3B) and an interior tongue surface 113*b* (shown in FIG. 3C). In various embodiments, the exterior tongue surface 113*a* of a strap engagement tongue positioned along a first strap pathway 110 may be provided within at least substantially the same plane as the adjacent portion(s) of the central surface of the strap pathway 110.

As illustrated in FIG. 3B, an exemplary strap engagement tongue 113 may extend from a first lateral side edge 118*a* (e.g., a lateral sidewall) into the first strap pathway 110 in a width direction towards the opposing lateral side edge 118*b* of the strap pathway 110. In various embodiments, the strap engagement tongue 113 may extend from a proximal end defined at the first lateral side edge 118*a* (e.g., the outer lateral side edge) in a width direction towards the opposing lateral side edge 118*b* thereof (e.g., the inner lateral side edge) to a distal end positioned in between the opposing lateral side edges 118*a*, 118*b*. For example, as illustrated in FIG. 3D, an exemplary strap engagement tongue 113 may be defined by a strap engagement tongue width 113*w* that is measured in a width direction (e.g., laterally) defined perpendicularly between the opposing lateral side edges (e.g., a first lateral side edge 118*a* and a second lateral side edge 118*b*) of the strap pathway 110. As a non-limiting example, in various embodiments, the strap engagement tongue width 113*w* of an exemplary strap engagement tongue 113 may be at least approximately between 5.0 mm and 30.0 mm (e.g., between 10.0 mm and 15.0 mm). In various embodiments, as illustrated, the strap engagement tongue 113 may be positioned to extend across a central portion of the first strap pathway 110 (e.g., defined by a midpoint along the strap pathway length thereof, at least approximately halfway between the first strap pathway end 111 and the second strap pathway end 112). For example, in various embodiments, at least a portion of the strap engagement tongue 113 may be aligned with (e.g., provided at the same position along the strap pathway length) the strap pathway protrusion 115.

As illustrated, the strap engagement tongue 113 may define a cantilevered configuration wherein the proximal end of the strap engagement tongue 113 is cantilevered at the first lateral side edge 118 and the portion of strap engagement tongue 113 positioned within the width of the strap pathway 110 is surrounded by a strap adjustment gap 113*c* that extends between the perimeter of the strap engagement tongue 113 and adjacent portions of the central surface of the strap pathway 110. For example, the strap adjustment gap 113*c* defined within the strap pathway 110 may be configured such that at least a portion of the first strap provided along the first strap pathway 110 (e.g., an intermediate strap portion) may be selectively positioned either above the strap engagement tongue 113 (e.g., so as to extend along the exterior tongue surface 113*a* thereof) or threaded underneath the strap engagement tongue 113 (e.g., so as to extend along the interior tongue surface 113*b* thereof). The strap adjustment gap 113*c* is configured to separate the strap engagement tongue 113 from the adjacent surfaces of the strap pathway 110 in order to allow a first strap to be selectively adjusted by a user between first and second arrangements above and below the strap engagement tongue 113, respectively, from the exterior of the mask. Such an exemplary configuration may enable the user to quickly rearrange the strap to reconfigure the face mask cover 100 between, for example, a locked and dynamic configuration, as described in further detail herein in reference to FIGS. 4A and 4B.

In various embodiments, the exterior tongue surface 113*a* of the strap engagement tongue 113 may comprise an at least substantially smooth surface configured to provide minimal frictional resistance to a strap (e.g., the intermediate portion of a first strap) passing therealong such that the face mask cover 100 may generally freely move along the given strap, such as, for example, when the face mask cover 100 is configured in the dynamic configuration and being adjusted by a user between the donned position and the drop-down position. By contrast, in various embodiments, the interior tongue surface 113*b* of the strap engagement tongue 113 may comprise an at least substantially abrasive surface configured to increase the frictional resistance realized at the strap (e.g., the intermediate portion of a first strap) passing therealong such that the movement of the face mask cover 100 along the given strap is at least substantially restricted, such as, for example, when the face mask cover 100 is configured in the locked configuration. For example, FIG. 3C illustrates a rear perspective view of an exemplary face mask cover 100 in accordance with one or more embodiments described herein. In various embodiments, the one or more strap engagement components of the exemplary face mask cover 100 may further comprise one or more pluralities of strap engagement teeth extending from an interior tongue surface of one or more strap engagement tongues positioned along a strap pathway of the face mask cover 100. For example, as illustrated in FIG. 3C, in various embodiments wherein the face mask cover 100 comprises both a first strap engagement tongue 113 and a second strap engagement tongue 123 provided along a first strap pathway 110 and a second strap pathway 120, respectively, the face mask cover 100 may comprise a first plurality of strap engagement teeth 114 protruding in an inward direction (e.g., perpendicularly) away from the interior tongue surface 113*b* of the first strap engagement tongue 113 and a second plurality of strap engagement teeth 124 protruding in an inward direction (e.g., perpendicularly) away from the interior tongue surface 123*b* of the second strap engagement tongue 123. For example, an exemplary strap engagement tooth of an exemplary facemask cover 100 may define a sharp peak defined having a small radius of curvature configured to provide a high-friction engagement with the strap to frictionally lock the strap in place, such that the face mask cover 100 is impeded from sliding relative to the strap as a result of unintentionally applied forces (e.g., bumping the mask, gently tugging on the mask, and/or the like).

In such an exemplary configuration, the first plurality of strap engagement teeth 114 positioned along the interior tongue surface 113*b* of the first strap engagement tongue 113 may be configured to physically engage a top (e.g., outward-facing) surface of a first strap (e.g., an intermediate strap portion thereof) that is arranged along the first strap pathway 110 in a locked configuration in order to cause a frictional force to be applied thereto to resist the relative movement of the first strap along the first strap pathway 110. For example, the first plurality of strap engagement teeth 114 may be configured to apply a force in an at least partially inward direction (e.g., toward the interior volume of the mask) to the top surface of the first strap engaged therewith in a direction perpendicular to the relative range of motion between the first strap and the first strap pathway 110. When the first strap is arranged in the locked configuration, as described herein, the first plurality of strap engagement teeth 114 may be configured to increase the resistance realized (e.g., by the selectively adjustable face mask cover 100) between the face mask cover 100 and the intermediate strap portion of the first strap engaged therewith.

Further, as illustrated, the second plurality of strap engagement teeth 124 positioned along the interior tongue surface 123*b* of the second strap engagement tongue 123 may be configured to physically engage a top (e.g., outward-facing) surface of a second strap (e.g., an intermediate strap portion thereof) that is arranged along the second strap pathway 120 in a locked configuration in order to cause a frictional force to be applied thereto to resist the relative movement of the second strap along the second strap pathway 120. For example, the second plurality of strap engagement teeth 124 may be configured to apply a force in an at least partially inward direction (e.g., toward the interior volume of the mask) to the top surface of the second strap engaged therewith in a direction perpendicular to the relative range of motion between the second strap and the second strap pathway 120. When the second strap is arranged in the locked configuration, as described herein, the second plurality of strap engagement teeth 124 may be configured to increase the resistance realized (e.g., by the face mask cover 100) between the face mask cover 100 and the intermediate strap portion of the second strap engaged therewith.

In various embodiments, one or more of the pluralities of strap engagement teeth provided along an interior tongue surface of a strap engagement tongue, such as, for example, the first plurality of strap engagement teeth 114 and/or the second plurality of strap engagement teeth 124, may be defined as rear teeth that extend from an interior surface of the exemplary face mask cover 100 towards an interior volume thereof. In various embodiments, at least a portion of the teeth of the first and second pluralities 114, 124 may be arranged in an at least substantially linear alignment along one or more sides of the respective interior tongue surface 113*b*, 123*b* from which the teeth extend. For example, as illustrated in FIG. 3C, in various embodiments, the first plurality of strap engagement teeth 114 and the second plurality of strap engagement teeth 124 provided along the first and second interior tongue surfaces 113*b*, 113*b*, respectively, may each be arranged so as to extend along each of the three sides defining the perimeter of the respective interior tongue surface upon which the teeth are provided.

In various embodiments, at least a portion of the front teeth of the first plurality of strap engagement teeth 114 and/or the second plurality of strap engagement teeth 124 may be defined by a respective tooth height measured in an inward direction perpendicular to the respective interior tongue surface 113*b*, 123*b*, from which the teeth extend. As an illustrative example, at least a portion of the rear teeth extending from an interior tongue surface of a strap engagement tongue defined along a strap pathway, as described herein, may be defined by a tooth height of at least approximately between 0.5 mm and 5.0 mm (e.g., between 1.0 mm and 3.0 mm).

In various embodiments, the one or more strap engagement components of the exemplary face mask cover 100 may further comprise one or more pluralities of strap engagement teeth extending from a surface defined along a strap pathway of the face mask cover 100. As illustrated, in various embodiments, the exemplary face mask cover 100 may comprise one or more pluralities of strap engagement teeth extending in an outward direction from an exterior surface of the face mask cover 100 defined at the second strap pathway end (e.g., a bottom strap pathway end) of one or more strap pathways of the face mask cover 100. For example, as illustrated in FIGS. 3A-3B, wherein the face mask cover 100 comprises both a first strap pathway 110 and a second strap pathway 120, the face mask cover 100 may comprise a first plurality of strap engagement teeth 119 extending in an outward direction from the exterior surface of the face mask cover 100 at the second strap pathway end 112 (e.g., the bottom end) of the first strap pathway 110 of the face mask cover 100 and a second plurality of strap engagement teeth 129 extending in an outward direction from the exterior surface of the face mask cover 100 at the second strap pathway end 122 (e.g., the bottom end) of the second strap pathway 120 of the face mask cover 100.

In such an exemplary configuration, the first plurality of strap engagement teeth 119 may be configured to physically engage at least a portion of the first strap slidably connected along the first strap pathway 110 in order to cause a frictional force to be applied thereto to resist the relative movement of the first strap along the first strap pathway 110 (e.g., as the face mask cover 100 is adjusted between the donned and drop-down positions). For example, the first plurality of strap engagement teeth 119 may be configured to apply a force in an at least partially outward direction (e.g., away from the exterior surface) to a bottom (e.g., inward-facing) surface of first strap engaged therewith in a direction perpendicular to the relative range of motion between the first strap and the first strap pathway 110. The first plurality of strap engagement teeth 119 may be configured to increase the resistance realized (e.g., by the selectively adjustable face mask cover 100) as the face mask cover 100 is being moved along the first strap (e.g., and the second strap) of the strap assembly between the donned and drop-down positions.

Further, as illustrated, the second plurality of strap engagement teeth 129 may be configured to physically engage at least a portion of the second strap slidably connected along the second strap pathway 120 in order to cause a frictional force to be applied thereto to resist the relative movement of the second strap along the second strap pathway 120 (e.g., as the face mask cover 100 is adjusted between the donned and drop-down positions). For example, in such an exemplary configuration, the second plurality of strap engagement teeth 129 may be configured to apply a force in an at least partially outward direction (e.g., away from the exterior surface) to a bottom (e.g., inward-facing) surface of second strap engaged therewith in a direction perpendicular to the relative range of motion between the second strap and the second strap pathway 120. The second plurality of strap engagement teeth 129 may be configured to increase the resistance realized (e.g., by the selectively adjustable face mask cover 100) as the face mask cover 100 is being moved along the second strap (e.g., and the first strap) of the strap assembly between the donned and drop-down positions.

In various embodiments, one or more of the pluralities of strap engagement teeth, such as the first plurality of strap engagement teeth 119 and/or the second plurality of strap engagement teeth 129, may be arranged along the exterior surface of the face mask cover 100 in an at least substantially linear alignment along a bottom end of a strap pathway (e.g., the second strap pathway end 112 of the first strap pathway 110 and/or the second strap pathway end 122 of the second strap pathway 120). In various embodiments, at least a portion of the front teeth of the first plurality of strap engagement teeth 119 and/or the second plurality of strap engagement teeth 129 may be defined by a respective tooth height measured from the exterior surface of the face mask cover 100 in a perpendicularly outward direction away from the exterior surface. As an illustrative example, at least a portion of the front teeth of an exemplary face mask cover 100 may be defined by a tooth height of at least approximately between 0.25 mm and 10.0 mm (e.g., between 1.0 mm and 5.0 mm).

In various embodiments, the one or more strap engagement components of the exemplary face mask cover 100 may further comprise a strap pathway protrusion 115 comprising a material protrusion extending from a lateral side edge (e.g., lateral sidewall) into the strap pathway in a width direction towards the opposing lateral side edge of the strap pathway in order to apply a resistance force to a strap (e.g., an intermediate strap portion of the strap) provided within the strap pathway in a locked configuration. In various embodiments, the strap pathway protrusion 115 may extend from a proximal end defined at a lateral side edge (e.g., a second lateral side edge 118*b*) in a width direction towards the opposing lateral side edge thereof (e.g., a first lateral side edge 118*a*) to a distal end provided at a position along the width of the first strap pathway 110 that is in between the opposing lateral side edges 118*a*, 118*b*. For example, the strap pathway protrusion 115 may be configured to physically engage at least a portion of the first strap slidably connected along the first strap pathway 110 in order to cause a frictional force to be applied to the first strap that resists the movement of the first strap relative to the face mask cover 100 along the first strap pathway 110 (e.g., when the first strap is provided in a locked configuration within the first strap pathway 110, as described herein).

As illustrated, the strap pathway protrusion 115 may be configured to effectively decrease the width of the first strap pathway 110 at one or more positions along the strap pathway length of the first strap pathway 110 corresponding to the position of the strap pathway protrusion 115. For example, as illustrated in FIG. 3D, the strap pathway protrusion 115 may be defined by a protrusion width 115*w* (e.g., defined in a width direction between the proximal end and the distal end of the strap pathway protrusion 115). As an illustrative example, in various embodiments, the protrusion width of an exemplary strap pathway protrusion 115 may be at least approximately between 0.5 mm and 5.0 mm (e.g., between 1.0 mm and 3.0 mm). The protrusion width 115*w* may be sufficiently large such that the distance between the distal end of the strap pathway protrusion 115 and the opposing lateral side edge 118*a* (e.g., as measured in a width direction perpendicularly therebetween) is at least substantially less than the strap width of the first strap extending therebetween. As further illustrated in FIG. 3D, the strap pathway protrusion 115 may be defined further by a protrusion length 1151 measured in a length direction corresponding to the direction of the strap pathway length of the first strap pathway 110. As an illustrative example, in various embodiments, the protrusion length 1151 of an exemplary strap pathway protrusion 115 may be at least approximately between 1.0 mm and 15.0 mm (e.g., between 3.0 mm and 8.0 mm). In various embodiments, as illustrated, the strap pathway protrusion 115 may be positioned at central portion of the first strap pathway 110 (e.g., defined by a midpoint along the strap pathway length thereof, at least approximately halfway between the first strap pathway end 111 and the second strap pathway end 112). For example, in various embodiments, at least a portion of the strap pathway protrusion 115 may be aligned with (e.g., provided at the same position along the strap pathway length) the strap engagement tongue 113.

For example, in an exemplary configuration wherein the first strap is in a locked configuration, as described herein (e.g., defined by a strap width of the first strap being positioned along a bottom surface of (e.g., beneath) the strap engagement tongue 113 and in between the distal end of the strap pathway protrusion 115 and the first lateral side edge 118*a*), the strap pathway protrusion 115 (e.g., the distal end) may physically engage (e.g., abut) at least a portion of the first strap so as to cause a frictional force resisting the movement of the first strap along the first strap pathway 110 (e.g., as the face mask cover 100 is adjusted between the donned and drop-down positions). For example, in an exemplary configuration wherein the first strap is arranged in a locked configuration relative to the first strap pathway 110, the strap pathway protrusion 115 may be configured to physically engage an intermediate strap portion of the first strap disposed at the central portion of the first strap pathway 110 (e.g., a portion of the first strap that is at least substantially aligned with and/or adjacent to the intermediate strap portion of the first strap positioned in alignment with the strap engagement tongue 113) so as to apply a force to the first strap in a direction that is at least substantially perpendicular to the strap length of the first strap (e.g., a width direction). In various embodiments, the strap pathway protrusion 115 is configured such that, when the first strap is arranged in the locked configuration, the strap pathway protrusion 115 may cause one or more resistance forces opposing the relative motion between the face mask cover 100 and a first strap to be increased, thereby functioning to secure the face mask cover 100 in the locked configuration (e.g., relative to the first strap).

Figure 4A:
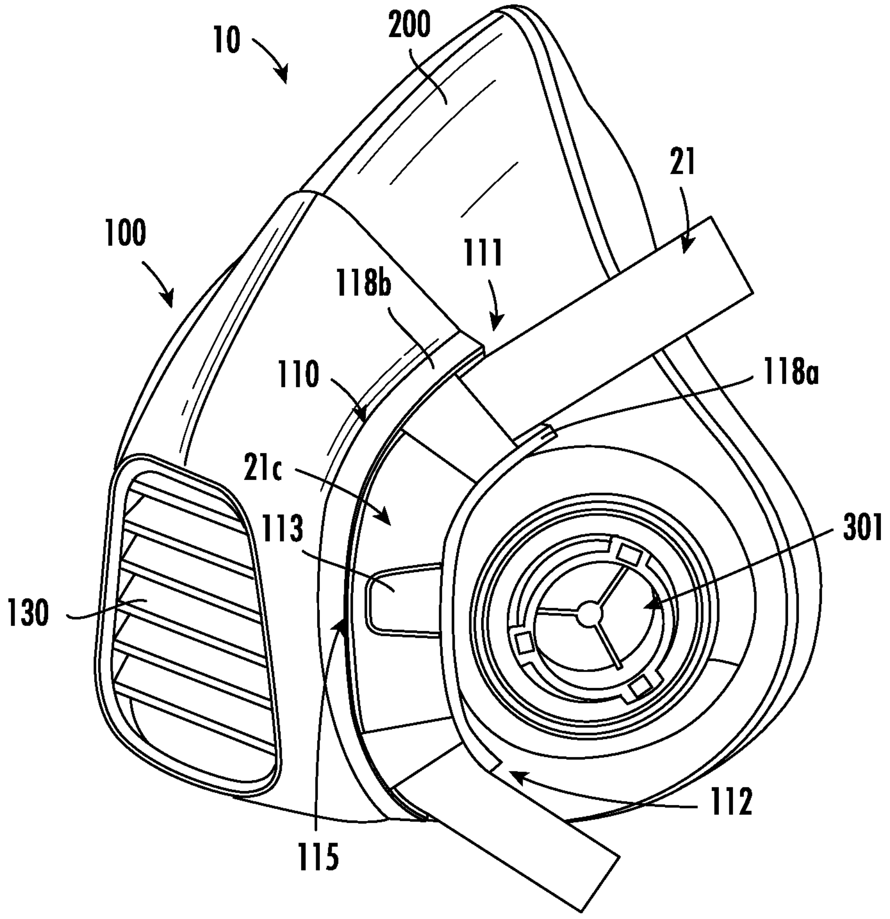
FIGS. 4A-4B illustrate perspective views of an exemplary face mask in a locked configuration and a dynamic configuration, respectively, in accordance with one or more embodiments described herein.
Figure 4B:
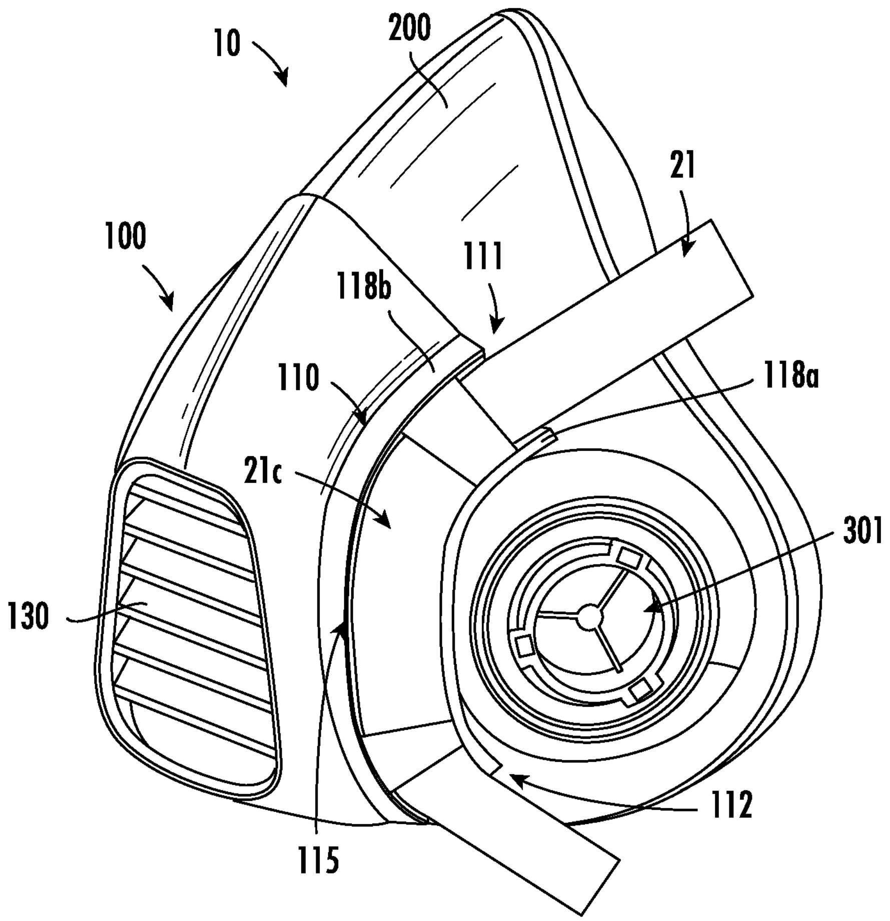

For example, FIGS. 4A and 4B illustrate perspective views of an exemplary face mask in a locked configuration and a dynamic configuration, respectively, in accordance with one or more embodiments described herein. In various embodiments, an exemplary face mask cover 100 may be selectively configurable (e.g., adjustable) between a dynamic configuration and a locked configuration. For example, the selectively dynamic configuration of the face mask cover 100 enables the face mask cover 100 to be selectively adjusted by a user between the dynamic configuration and the locked configuration based at least in part on a selective rearrangement of the first and second straps of the strap assembly relative to one or more strap engagement components defined along the first and second strap pathways 110, 120, respectively. The movement of the face mask cover 100 along the first strap 21 and/or a second strap, as described herein, may be at least partially restricted via frictional resistance. For example, the restriction preventing movement of the face mask cover 100 between a donned position and a drop-down position may be caused at least in part by the friction between the first strap 21 and the one or more strap engagement components defined along the first strap pathway 110 along which the first strap 21 (e.g., the intermediate strap portion 21*c* thereof) is arranged. As a further example, in various embodiments, a first strap 21 may be arranged within the first strap pathway 110 such that at least one strap engagement components defined by the face mask cover 100 along the first strap pathway 110 may engage the first strap 21 (e.g., an intermediate strap portion 21*c*) and cause one or more resistance forces to be applied thereto to oppose the relative movement of the first strap 21 along the strap pathway length of the first strap pathway 110.

During operation of an exemplary face mask assembly, the face mask 10 (e.g., face mask cover 100) may need to remain stable on the face of the user, even in instances the face mask 10 is equipped with heavy filter cartridges and/or in instances the user makes sudden head movements. In various embodiments, the strap engagement features defined along the strap pathways of the face mask cover 100 may be configured to provide sufficient frictional resistance to each of the first and second straps of the strap assembly such that the face mask cover 100 may not substantially move along the first and/or second straps, even with heavy filter cartridges and/or sudden movements (e.g., thereby preventing any contaminants from reaching the user due to a leakage in sealing of the face mask 10). In various embodiments, as described herein, the face mask cover 100 may be selectively configured in a locked configuration upon the face mask cover 100 being provided in a donned position so as to maintain the position of the face mask cover 100 against the face of a user (e.g., covering the user's nose and mouth) during operation.

As a non-limiting illustrative example, the exemplary face mask cover 100 illustrated in FIG. 4A is shown in a locked configuration wherein the relative motion between a first strap 21 and the face mask cover 100 (e.g., the first strap pathway 110) is at least substantially minimized based at least in part on the arrangement of the intermediate strap portion 21*c* of the first strap 21 relative to the strap engagement tongue 113 provided at a center portion of the first strap pathway 110, as described herein. In various embodiments, an exemplary face mask cover 100 may be configured in the locked configuration, as illustrated in FIG. 4A, based at least in part on the intermediate strap portion of one or both of the first strap 21 and the second strap being arranged so as to extend beneath a bottom surface of the strap engagement tongue 113, 123 defined at the respective center portions of the first and second strap pathways 110, 120. As illustrated, the locked configuration of the face mask cover 100 may be defined at least in part by the intermediate strap portion 21*c* of the first strap 21 being arranged to extend along an interior-facing bottom surface of (e.g., beneath) the strap engagement tongue 113.

For example, arranging the face mask in a locked configuration may include adjusting the first strap 21 provided within the first strap pathway 110 of a face mask cover 100 such that at least a portion of an intermediate strap portion 21*c* is threaded underneath the strap engagement tongue 113, thereby causing the portion of the first strap extending along the interior tongue surface of the tongue 113 to be engaged by the plurality of strap engagement teeth protruding from the interior tongue surface of the tongue such that one or more resistance forces are applied thereto. In various embodiments, the face mask cover 100 may be configured such that a user arranging the face mask in the locked configuration prevents the face mask cover 100 from sliding along the straps engaged therewith and allows the face mask cover 100 to remain in place on the face of the user. As described herein, in various embodiments, the plurality of strap engagement teeth protruding perpendicularly away from the bottom surface of the strap engagement tongue 113 may be configured to engage a top surface of the intermediate strap portion 21*c* and apply a force thereto in an at least partially interior-facing (e.g., downward direction (e.g., a direction away from the exterior surface of the tongue 113) perpendicular to the strap length defined by the intermediate strap portion 21*c* engaged therewith. The restriction preventing movement of the face mask cover 100 may be caused by the friction between the first and second straps provided along the first and second strap pathways, respectively, and the strap engagement tongues and/or strap engagement teeth engaged therewith.

Although the exemplary face mask cover 100 shown in FIG. 4A is described above with respect to an arrangement in the locked configuration based on the arrangement of the first strap relative to the strap engagement components (e.g., the strap engagement tongue 113) positioned along the first strap pathway 110, it should be understood that exemplary face mask covers 100 described herein include similar configurations and functionalities with respect to the selective arrangement of the second strap of the strap assembly relative to the strap engagement components (e.g., the strap engagement tongue 123, as illustrated in FIGS. 3A and 3C) positioned along the second strap pathway. For example, in various embodiments, an exemplary face mask cover 100 being selectively configured in a locked configuration upon being arranged in a donned position may require both the first and second straps being reconfigured to pass underneath the first and second strap engagement tongues 113, 123, respectively.

In various embodiments, an exemplary face mask cover 100 may be configured to facilitate a selective adjustment from the locked configuration shown in FIG. 4A to a dynamic configuration, as illustrated in FIG. 4B. For example, the face mask cover 100 may be selectively arranged in a dynamic configuration in which the face mask cover 100 is slidably engaged with the first and second straps of the strap assembly and configured for movement with minimized resistance (e.g., sliding) along the respective strap lengths thereof to enable selective adjustment of the face mask cover 100 between a donned position and a drop-down position (e.g., wither from a donned position to a drop-down position or vice versa, from a donned position to a drop-down position). As illustrated in FIG. 4B, the dynamic configuration of the face mask cover 100 may be defined at least in part by the intermediate strap portion 21*c* of the first strap 21 being arranged to extend along a central portion of the strap pathway 110 without being threaded underneath the strap engagement tongue 113, and thereby merely passing over an exterior tongue surface (e.g., above) of the strap engagement tongue 113. For example, arranging the face mask in a dynamic configuration may include adjusting the first strap 21 provided within the first strap pathway 110 of a face mask cover 100 such that the strap width of the intermediate strap portion 21*c* continues to move along an exterior central surface of the strap pathway 110 as it passes through the central portion of the strap pathway defined by the strap engagement tongue 113. In such an exemplary configuration, the first strap 21 avoids engagement with the plurality of strap engagement teeth protruding from the interior tongue surface of the strap engagement tongue 113 and thereby avoids the additional frictional forces resisting the relative movement of the first strap along the first strap pathway 110, as described herein with respect to the locked configuration illustrated in FIG. 4A. As described herein, in various embodiments, the exterior tongue surface of the strap engagement tongue 113 may comprise an at least substantially smooth surface configured to provide minimal frictional resistance to the first strap 21 as it is moved relative thereto, such that the face mask cover 100 in the dynamic configuration, as illustrated, may be moved generally freely along the strap length of the first strap 21, such as, for example, by a user for adjustment between the donned position illustrated in FIG. 4B and a drop-down position.

For example, the face mask cover 100 may be configured such that a user may easily rearrange the first and second straps from a locked configuration to a dynamic configuration by pulling the straps through the strap adjustment gaps defined along the respective first and second strap pathways to remove the straps from underneath the respective first and second strap engagement tongues. Upon both the first and second straps being arranged in the dynamic configuration, as illustrated with respect to the first strap 21 shown in FIG. 4B, the face mask cover 100 (e.g., the face mask as a whole, including the face mask cover) may travel along the first and second straps at least substantially simultaneously to move the face mask cover 100 from the illustrated donned position—wherein the face mask covers the nose and mouth of the user—to a drop-down position wherein the face mask (e.g., the face mask cover 100) is at least partially removed from the face of the user beneath the user's chin, such as, for example, in a removed position hanging from the user's neck. In various embodiments wherein the face mask and/or the face mask cover 100 is arranged in the drop-down position, the strap assembly, including the first and second straps and the head support component as described herein, may remain engaged with the head of the user such that the face mask cover 100 may effectively be removed from the donned position covering the mouth and nose of the user without having to fully remove the strap assembly and/or any other wearable PPE layered over top thereof from the head of the user. Further, as described herein the configuration of the face mask cover 100 that facilitates the closed-loop configuration of the first and second straps and enables the dynamic configuration of the face mask 10 along the respective strap lengths of the first and second straps allows the face mask cover 100 to remain tethered to the closed-loop straps so as to be easily accessible to the user for selective adjustment from the drop-down position to the donned position, as described herein.

As described above with respect to the description of FIG. 4A, although the exemplary face mask cover 100 shown in FIG. 4B is described above with respect to an arrangement in the dynamic configuration based on the arrangement of the first strap relative to the strap engagement components (e.g., the strap engagement tongue 113) positioned along the first strap pathway 110, it should be understood that exemplary face mask covers 100 described herein include similar configurations and functionalities with respect to the selective arrangement of the second strap of the strap assembly relative to the strap engagement components (e.g., the strap engagement tongue 123, as illustrated in FIGS. 3A and 3C) positioned along the second strap pathway. For example, in various embodiments, an exemplary face mask cover 100 arranged in a donned position being selectively configured in a dynamic configuration to enable adjustment thereof to a drop-down position may require both the first and second straps being reconfigured to be removed (e.g., through the respective strap adjustment gaps) from underneath the first and second strap engagement tongues 113, 123, respectively, so as to freely pass overtop the strap engagement tongues 113, 123 without resistance forces being applied thereto (e.g., via the strap engagement teeth). For example, as described herein, the face mask cover 100 comprises a selectively dynamic configuration relative to the strap assembly 20 wherein the face mask cover 100 is slidably engaged with first strap 21 and second strap at the first and second strap pathways 110, 120, respectively. For example, the face mask cover 100 may be configured such that as the first strap pathway 110 and the second strap pathway are selectively moved (e.g., slid) along the respective strap lengths of the first and second straps 21, 22, the face mask cover 100 may be selectively adjusted between the donned position and the drop-down position.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A face mask assembly configured with a drop down feature, the face mask assembly comprising:

a face mask configured for dynamic engagement with at least a first strap of a strap assembly such that the face mask is configured for selective movement in one or more directions along a strap length of the first strap between a donned position and a drop-down position, the face mask comprising:

a first strap pathway comprising an exterior pathway surface positioned on a first lateral side of the face mask, the first strap pathway being configured to receive at least a portion of the first strap along the exterior pathway surface; and a strap engagement tongue defined by a material thickness extending between an exterior tongue surface and an interior tongue surface, the strap engagement tongue comprising a plurality of strap engagement teeth protruding from the interior tongue surface;

wherein the strap engagement tongue is positioned along the first strap pathway such that the exterior tongue surface defines at least a portion of the exterior pathway surface of the first strap pathway;

wherein the face mask is configured to be selectively adjustable between a dynamic configuration and a locked configuration relative to the first strap based at least in part on the arrangement of the first strap relative to the strap engagement tongue, wherein, in the locked configuration, the plurality of strap engagement teeth are configured to provide frictional resistance to the first strap to resist the movement of the face mask relative to the strap length of the first strap, and wherein, in the dynamic configuration, the first strap is configured to be positioned on and slide over the exterior tongue surface while the first strap is positioned on the exterior pathway surface.

2. The face mask assembly of claim 1, wherein the face mask is dynamically engaged with the strap assembly via a connection of the first strap to a face mask cover of the face mask, wherein the first strap pathway is defined along an exterior surface of the face mask cover.

3. The face mask assembly of claim 2, further comprising:

a face engagement component configured to engage a face of a user at a seal interface that extends along a perimeter of an open end of the face engagement component; and wherein the face engagement component and the face mask cover define distinct components configured to be removably attached to one another.

4. The face mask assembly of claim 2, further comprising:

a second strap pathway comprising a second exterior pathway surface defined along the exterior surface of the face mask cover and positioned on a second lateral side of the face mask, the second strap pathway being configured to receive at least a portion of a second strap of the strap assembly along the second exterior pathway surface such that the face mask is configured for selective movement in one or more directions along a second strap length of the second strap; and a second strap engagement tongue defined by a second material thickness extending between a second exterior tongue surf ace and a second interior tongue surface, the second strap engagement tongue comprising a second plurality of strap engagement teeth protruding from the second interior tongue surface;

wherein the second strap engagement tongue is positioned along the second strap pathway such that the second exterior tongue surface defines at least a portion of the second exterior pathway surface of the second strap pathway; and wherein, in the locked configuration, the second plurality of strap engagement teeth are configured to provide frictional resistance to the second strap to resist the movement of the face mask relative to the second strap length of the second strap.

5. The face mask assembly of claim 1, wherein the first strap is defined along the strap length between a first strap end and a second strap end, wherein the first strap end and the second strap end of the first strap are each configured for attachment to a head support component of the strap assembly such that the first strap defines a closed-loop strap portion including an intermediate strap portion defined in between the first strap end and the second strap end, and wherein the first strap pathway is configured to receive the first strap at the intermediate strap portion such that the selective movement of the face mask between the donned position and the drop-down position is at least partially defined within the closed-loop strap portion of the first strap.

6. The face mask assembly of claim 5, wherein a second strap of the strap assembly is defined along a second strap length between two opposing strap ends, wherein both of the two opposing strap ends of the second strap are configured for attachment to the head support component of the strap assembly such that the second strap defines a second closed-loop strap portion including a second intermediate strap portion defined in between the two opposing strap ends, and wherein a second strap pathway is configured to receive the second strap at the second intermediate strap portion such that the selective movement of the face mask between the donned position and the drop-down position is defined at least partially within the second closed-loop strap portion of the second strap.

7. The face mask assembly of claim 1, wherein the first strap pathway comprises a strap pathway protrusion further comprising a material protrusion extending from a first lateral side edge of the first strap pathway in a width direction towards a second lateral side edge of the first strap pathway, wherein the strap pathway protrusion is configured to physically engage the first strap in order to provide frictional resistance to the first strap to resist the movement of the face mask relative to the strap length of the first strap.

8. The face mask assembly of claim 7, wherein the strap pathway protrusion is arranged in a position along the first strap pathway that is at least aligned with at least a portion of the strap engagement tongue.

9. The face mask assembly of claim 8, wherein the strap pathway protrusion and the strap engagement tongue are provided at a central portion of the first strap pathway, the central portion being defined by a midpoint along a strap pathway length of the first strap pathway at least halfway between a first strap pathway end and a second strap pathway end.

10. The face mask assembly of claim 1, wherein the first strap pathway extends along a strap pathway length between a first strap pathway end and a second strap pathway end, and wherein the first strap pathway further comprises a second plurality of strap engagement teeth protruding from the exterior pathway surface at the second strap pathway end of the first strap pathway.

11. The face mask assembly of claim 10, wherein the second strap pathway end of the first strap pathway is defined by a bottom end of the first strap pathway positioned at least adjacent a bottom edge of the face mask.

12. The face mask assembly of claim 10, wherein the second plurality of strap engagement teeth are configured to protrude from the exterior pathway surface in an at least outward direction away from the face mask so as to provide frictional resistance to a bottom surface of the first strap to resist the movement of the face mask relative to a first strap length of the first strap.

13. The face mask assembly of claim 10, further comprising:

a second strap pathway comprising a second exterior pathway surface defined along the exterior surface of the face mask and positioned on a second lateral side of the face mask, the second strap pathway being configured to receive at least a portion of a second strap of the strap assembly along the second exterior pathway surface such that the face mask is configured for selective movement in one or more directions along a second strap length of the second strap;

wherein the second strap pathway extends along a second strap pathway length between a third strap pathway end and a fourth strap pathway end, and wherein the second strap pathway further comprises a third plurality of strap engagement teeth protruding from the second exterior pathway surface at the fourth strap pathway end of the second strap pathway;

wherein the third plurality of strap engagement teeth are configured to protrude from the second exterior pathway surface in an at least outward direction away from the face mask so as to provide frictional resistance to a bottom surface of the second strap to resist the movement of the face mask relative to the second strap length of the second strap.

14. The face mask assembly of claim 1, wherein the first strap pathway is defined by an at least partially curved profile, wherein an at least partially curved profile of the first strap pathway is defined by an arc-shaped curve having a curve apex and a curve opening, the curve opening facing towards the first lateral side of the face mask.

15. The face mask assembly of claim 1, wherein, in the dynamic configuration, the first strap is configured to slide over the exterior tongue surface while the first strap is contained between a first lateral side edge and a second lateral side edge of the exterior pathway surface.

16. The face mask assembly of claim 1, wherein the first strap pathway further comprises at least one strap engagement slot defined by an opening in the exterior pathway surface that is configured to receive a portion of the first strap to facilitate the dynamic engagement of the first strap by the face mask.

17. The face mask assembly of claim 16, wherein the at least one strap engagement slot comprises a plurality of strap engagement slots distributed along a strap pathway length of the first strap pathway, each of the plurality of strap engagement slots being configured to receive a respective portion of the first strap.

18. The face mask assembly of claim 17, wherein the plurality of strap engagement slots distributed along the strap pathway length of the first strap pathway includes a first slot, a second slot, a third slot, and a fourth slot, each extending in respective width directions between opposing lateral side edges of the first strap pathway, and wherein the first strap pathway is configured to dynamically engage the first strap by threading the first strap in alternating directions through adjacent slots of the plurality of strap engagement slots.

19. The face mask assembly of claim 18, wherein the strap engagement tongue is positioned along the strap pathway length in between the second slot and the third slot.

20. The face mask assembly of claim 1, wherein the face mask is configured to be selectively adjustable between the dynamic configuration and the locked configuration relative to the first strap via receiving the first strap through a strap adjustment gap defined by a slot opening in the exterior pathway surface extending around at least a portion of an outer perimeter of the strap engagement tongue to separate the strap engagement tongue from adjacent portions of the exterior pathway surface of the first strap pathway.

* * * * *